United States Patent [19]
Suetsugi et al.

[11] Patent Number: 5,471,323
[45] Date of Patent: Nov. 28, 1995

[54] SOLID STATE VIDEO CAMERA HAVING IMPROVED CHROMATIC ABERRATION SUPPRESSION AND MOIRE SUPPRESSION

[75] Inventors: Keisuke Suetsugi, Osaka; Hiroshi Kanno, Kashiwara; Masayuki Sugawara, Komae; Kohji Mitani, Sagamihara; Yoshihiro Fujita, Tama; Toshinori Saitoh, Komae; Yuichi Ninomiya, Kawasaki, all of Japan

[73] Assignees: Matsushita Electric Industrial Co., Ltd, Osaka; Matsushita Communication Industrial Co., Ltd., Yokohama; Nippon Hoso Kyokai, Tokyo, all of Japan

[21] Appl. No.: 245,192

[22] Filed: May 17, 1994

[30] Foreign Application Priority Data

May 19, 1993 [JP] Japan .................. 5-116937

[51] Int. Cl.⁶ .................................. H04N 9/097
[52] U.S. Cl. .................. 358/511; 348/234; 348/238; 348/264
[58] Field of Search .............. 358/511; 348/235–238, 348/337–340, 354–355, 659–661, 712–713, 262–265; 359/639–640; H04N 1/46, 9/097, 9/09

[56] References Cited

U.S. PATENT DOCUMENTS

| | | | |
|---|---|---|---|
| 3,546,370 | 12/1970 | Kimball | 348/238 |
| 4,281,339 | 7/1981 | Morishita et al. | 348/236 |
| 4,507,679 | 3/1985 | Bendell | 348/238 |
| 4,725,880 | 2/1988 | Dischert. | |
| 5,291,276 | 1/1994 | Matsumoto et al. | 348/659 |
| 5,337,152 | 8/1994 | Kotaki | 348/235 |
| 5,374,955 | 12/1994 | Furuhata et al. | 348/238 |

FOREIGN PATENT DOCUMENTS

| | | |
|---|---|---|
| 476421 | 3/1992 | European Pat. Off.. |
| 60-26418 | 12/1985 | Japan. |
| 5014769 | 1/1993 | Japan. |
| 8505526 | 12/1985 | WIPO. |

OTHER PUBLICATIONS

1. S. Yamanaka et al.; "3CCD Color Camera System"; *Television Broadcasting Society Report*, presented Sep. 28, 1978; 1978; pp. 15–20 (with English–language translation).

*Primary Examiner*—Scott A. Rogers
*Assistant Examiner*—Kim Yen Vu
*Attorney, Agent, or Firm*—Panitch Schwarze Jacobs & Nadel

[57] ABSTRACT

By applying the offset sampling using four-plane prism provided with four solid state imaging devices at four light output planes, chromatic aberration of lenses is eliminated even to the peripheral part of the imaging plane, and moire suppression effect is much enhanced. Furthermore, by using a plural number of matrix circuits, and by producing the luminance signal by changing the matrix ratios in low frequency range and in high frequency range, moire suppression effect is further enhanced, and luminance error is also eliminated.

7 Claims, 10 Drawing Sheets

SOLID STATE VIDEO CAMERA HAVING IMPROVED CHROMATIC ABERRATION SUPPRESSION AND MOIRE SUPPRESSION

FIELD OF THE INVENTION AND RELATED ART STATEMENT

1. Field of the Invention

The present invention relates to a video camera using solid-state imaging devices

2. Description of the Related Art

The resolution of a video camera using a solid state picture imaging device is determined by a number of pixels of the solid state imaging device used therein. Improvement of the resolution of a solid state imaging device can be realized by increasing the number of pixels of the solid state imaging device. However, increasing of the pixel number while keeping the imaging size of the device constant results in a reduction of the size of individual pixels, and it introduces lowering in its important performance characteristics such as sensitivity and dynamic range. Therefore, the improvement of resolution of a solid state imaging device by adapting the increase of pixel number was feasible only in the extent that the sensitivity and the dynamic range obtainable from the device could fulfill the performance required for a video camera.

Heretofore, in order to obtain a high resolution capability using a solid state imaging device having a limited number of pixels, the RGB offset sampling has widely been investigated. The detail is described in "3 CCD Camera Scheme" (Television Gakkai Gijutsu Hokoku (Technical Report of Japan Television Engineering Institute), ED-395, authors: Yamanaka, Yamazaki, Hashimoto, Abe, Ochi, published on 28, Sep., 1978).

In the following, explanation is given on the configuration of the RGB offset sampling scheme and problems thereon.

The basic configuration comprises a three primary color prism, three solid state imaging devices respectively for green channel, blue channel, and red channel. At the three primary color prism, setting-positions of the solid state imaging devices for the red channel and for the blue channel are taken to be offset by an amount of half pitch of the horizontal pixel pitch in the horizontal direction with respect to the setting-position of the solid state device for the green channel in reference to its optical image. As a result of the above-mentioned offset, for the luminance signal which is obtained by combining respective color channel signals, the number of sampling points upon an optical image becomes effectively increased, and thereby the moire is suppressed and hence a high resolution is gained.

In the RGB offset sampling scheme, there are two problems.

First one is that, in the peripheral part of an imaging plane of a solid state device, due to the chromatic aberration of lens, the above-mentioned moire suppression capability is no longer available. As one of the chromatic aberrations of lens, the lateral chromatic aberration is known such that the size of focused image is dependent on light wavelength. According to the conventional RGB offset sampling scheme, the pixel is offset among different color channels. Therefore, the moire suppression function is insufficient as the area considered comes closer to the periphery of the imaging plane owing to influence of the chromatic aberration of the lens.

Secondly, since the solid state imaging devices for the red channel and the blue channel are placed at the same or equivalent position for an optical image, that is, at respective positions at which the same image is focused and offsetting is made only for the green channel, the moire suppression effect is limited only to green channel, but cannot be obtained for those colors not including green light, namely for such colors as red, blue, and magenta.

OBJECT AND SUMMARY OF THE INVENTION

The purpose of the present invention is to offer a video camera in which the effect of the chromatic aberration is suppressed sufficiently, even at such parts close to the periphery of the imaging plane, and that, even for those colors not containing green light the moire suppression capability by the offset sampling scheme is attainable.

Another purpose of the present invention is, by using a simple circuit configuration, to suppress the moire completely for colors which contain red light and blue light at the same level.

Further purpose of the present invention is to suppress the moire completely for colors which contains red light and blue light at the same level, and also to exclude the luminance error.

Still another purpose of the present invention is to suppress the moire completely for all colors except for those pure colors of red and blue, and at the same time, to exclude the luminance error.

In order to accomplish the above-mentioned purposes, a video camera of the present invention comprises an imaging part and a signal processing part having the following features.

An imaging part comprises a prism for dividing an incident light L into four channels in total of two green channel lights, a blue channel light, and a red channel light, and four solid state imaging devices placed respectively for those four channel positions. Those two green channel solid state imaging devices are disposed offset mutually by a half pixel pitch in horizontal direction of frame. Those blue channel solid state imaging device and red channel solid state imaging device are also placed by offsetting them mutually by a half pixel pitch in the horizontal direction. From these four solid state imaging devices, video signals corresponding to their respective color channels are outputted.

The signal processing part is comprised of a white balance circuit, at least one matrix circuit and a mixing circuit. The white balance circuit performs operations of addition of two green channel signals as well as performing the white balancing operation among those red, green, and blue channel signals out of those video signals outputted from the imaging part. The matrix circuit produces a luminance signal by combining those green, blue and red channel signals outputted from the white balance circuit with a specified matrix ratio. In a first matrix circuit its matrix ratio is set to a ratio determined by a television standard being in use. In a second matrix circuit its matrix ratio is set different from a ratio determined by a television standard. The mixing circuit makes an addition of outputs of the first and the second matrix circuits and issues it.

In such configuration, since two green channel solid state imaging devices are mutually pixel-offset in the horizontal direction in the imaging part, the moire effect can be suppressed without receiving the effect of the lens chromatic aberration even at the peripheral part of the imaging plane. Since the red channel solid state imaging device and the blue channel solid state imaging device are also pixel-offset, the moire suppression effect owing to the pixel offset is achieved also for those colors not containing green light.

It is preferable to set the matrix ratio of the second matrix circuit in the signal processing part to a ratio at which a higher moire suppression effect can be obtained. And, a final luminance signal should be outputted by adding low frequency components of the first matrix circuit output and high frequency components of the second matrix circuit output.

By the above-mentioned configuration, the luminance error can be suppressed by combining the low frequency signal of the luminance signal in accordance with the matrix ratio prescribed by a television standard in use; and by taking the high frequency signal of a matrix ratio suitable for getting a higher moire suppression effect, it becomes possible to make the moire suppression effect optimum.

DESCRIPTION OF THE PREFERRED EMBODIMENTS

FIRST EMBODIMENT

Figure 1:
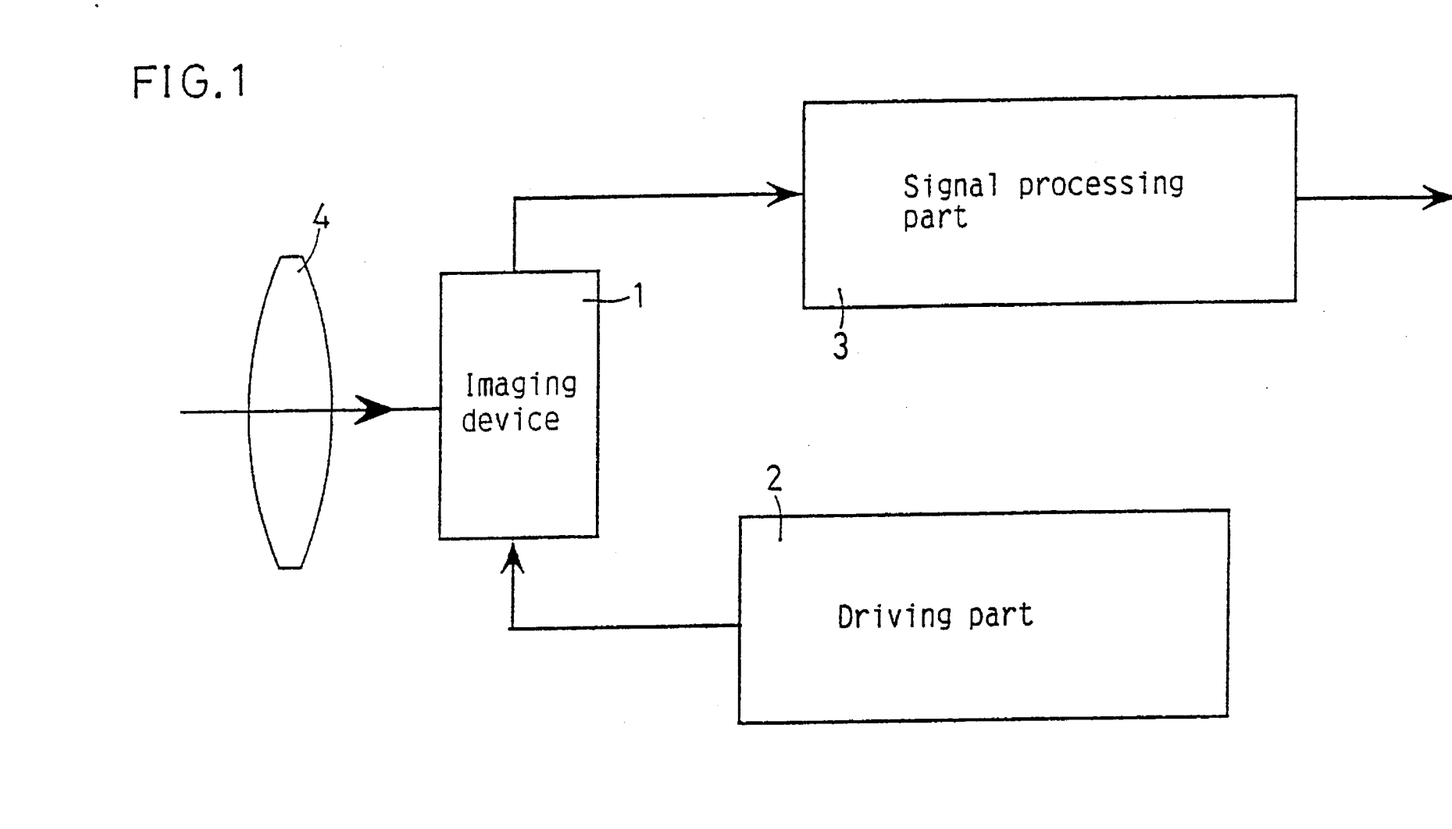
FIG. 1 is a block diagram of a video camera concerning a first embodiment of the present invention.

In FIG. 1 which is a block diagram of a video camera concerning a first embodiment of the present invention, the configuration comprises an imaging part 1, a driving part 2, a signal processing part 3, and a lens 4. An optical image incident through the lens 4 is focused on a solid state imaging device which is a composing element of the imaging part 1. The driving part 2 generates driving pulses for driving the solid state imaging devices and drives the solid state imaging devices. The signal processing part 3 performs its processing on the video signals issued from the solid state imaging devices and issues output signals.

Figure 2:
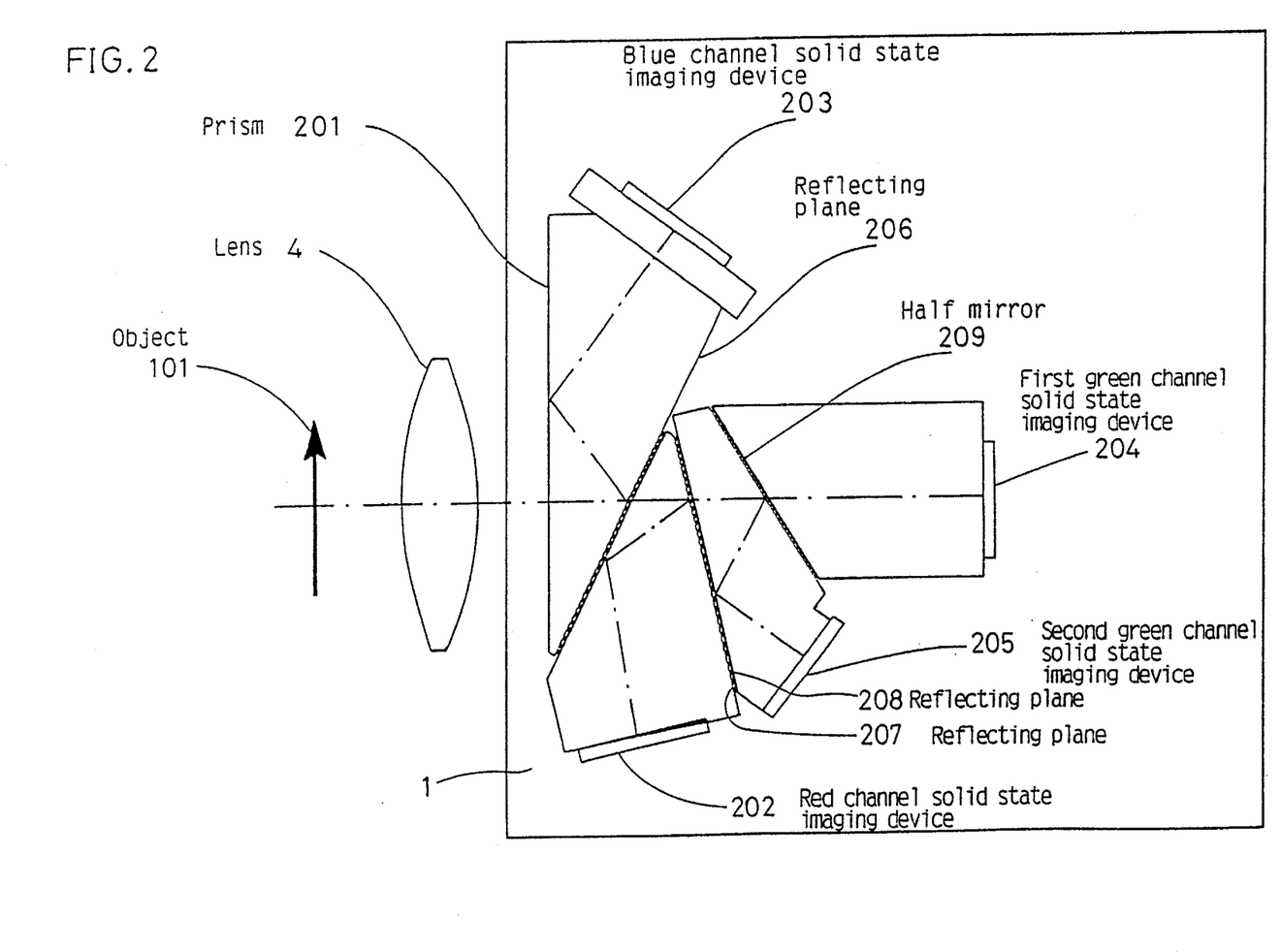
FIG. 2 is a structural drawing showing the relation between lens 4 and imaging part 1 concerning the first embodiment of the present invention.

FIG. 2 is a structural drawing showing the relation between lens 4 and imaging part 1 concerning the first embodiment of the present invention.

The imaging part 1 comprises a prism 201, which is for decomposing an incident optical image into four images of different color channels, and a set of four solid state imaging devices 202, 203, 204, 205 provides for those four color channels. The set of four solid state imaging devices consists of a solid state imaging device 202 for red channel, a solid state imaging device 203 for blue channel, a solid state imaging device 204 for a first green channel and a solid state imaging device 205 for a second green channel.

For an optical image incident through a lens 4, first, a blue light component is reflected by a reflecting plane 206 and focused on the blue channel solid state imaging device 203. Among those light components transmitting through the first reflecting plane 206, a red light component is further reflected by a second reflecting plane 207 and is focused on the red channel solid state imaging device 202. Still further, a green channel light which has been transmitted through a reflecting plane 208 is divided into two by a half mirror 209, and they are respectively focused on the first green channel solid state imaging device 204 and the second green channel solid state imaging device 205.

Those solid state imaging devices 202, 203, 204, and 205 sample the optical images focused thereon, perform the optoelectric conversion and issue respective video signals corresponding to their respective optical images.

Figure 3:
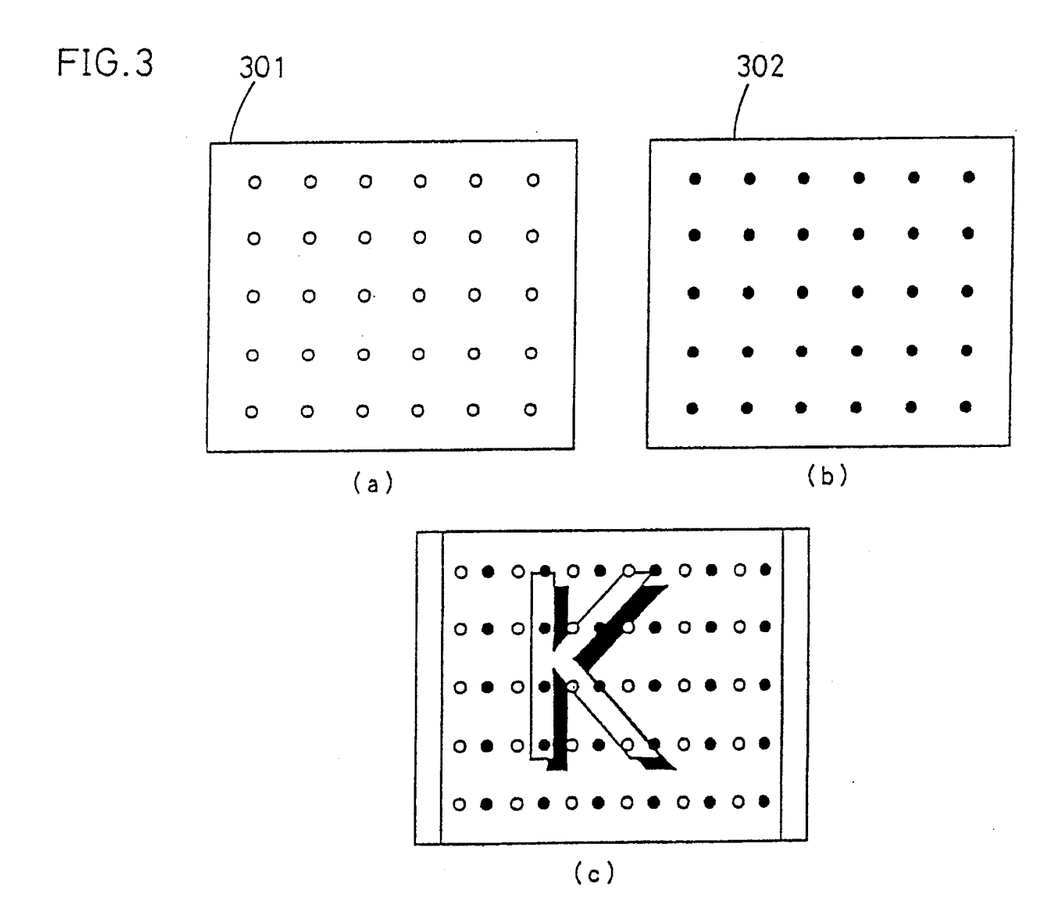
FIG. 3 is a conceptual drawing showing the positional relation between an optical image and two solid state imaging devices in case of applying the horizontal pixel offset in the first embodiment of the present invention.

FIG. 3 is a conceptual drawing showing the optical relation between an optical image and two solid state imaging devices in case of applying the horizontal pixel offset in the first embodiment of the present invention.

Pixels on a first solid state imaging device 301 are shown by small open (white) circles as shown in (a), whereas pixels on a second solid state imaging device 302 are shown by small filled (black) circles as shown in (b). They are arranged in such a way that they are offset mutually by a half of pixel pitch in the horizontal direction with respect to the optical image as shown in (c). Positional relation between these two solid state imaging devices 301 and 302 corresponds to that between the first green channel solid state imaging device 204 and the second green channel solid state imaging device 205 or that between the red channel solid state imaging device 202 and the blue channel solid state imaging device 203. Accordingly, by utilizing the outputs of those two solid state imaging devices, signal having a band width as broad as twice of that of the conventional imaging device having a single solid state imaging device can be obtained.

Figure 4:
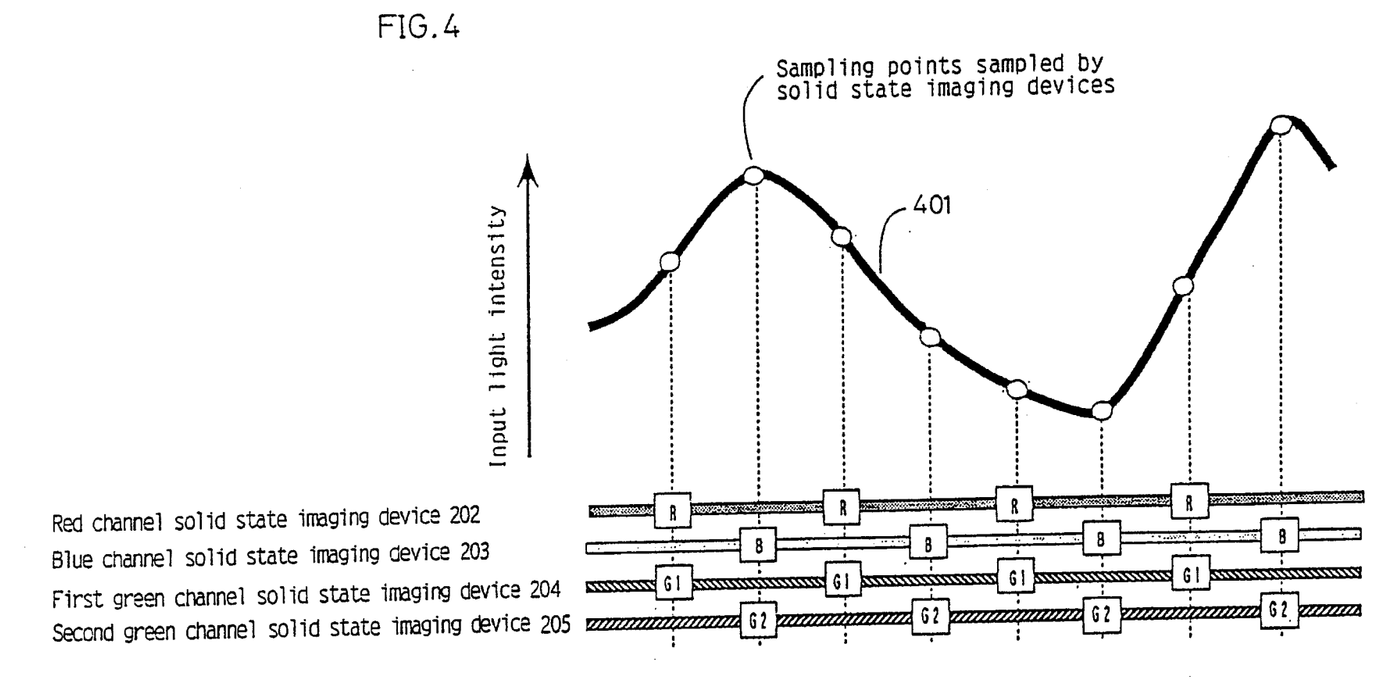
FIG. 4 is a conceptual drawing showing the optical positional relation between pixels of four solid state imaging devices in the first embodiment and a waveform obtained from an optical image focused thereon.

FIG. 4 is a conceptual drawing showing the optical positional relation between pixels of four solid state imaging devices in the first embodiment and a waveform obtained from an optical image focused thereon.

In FIG. 4, a waveform 401 shows an intensity distribution on a horizontal scanning line of an optical image determined by an object, wherein sample points are represented by small open circles. And, relative sampling positions on a horizontal scanning line determined by pixels respectively of the red channel solid state imaging device 202, the blue channel solid state imaging device 203, the first green channel solid state imaging device 204, and the second green channel solid state imaging device 205 are shown in a lower part of FIG. 4.

In a first embodiment, the first and the second green channel solid state imaging devices 204 and 205 are mutually pixel-offset, and furthermore, the red channel solid state imaging device 202 and the blue channel solid state imaging device 203 are arranged with a pixel offset. And the red channel solid state imaging device 202 and the first green channel solid state imaging device 204 are placed at such positions where they receive the same optical image; while the blue channel solid state imaging device 203 and the second green channel solid state imaging device 205 are placed at positions where they receive the same optical image. As is known from this, the object image is sampled by a doubled sampling frequency by the use of two green channel solid state imaging devices, and also by use of the red channel solid state imaging device and the blue channel solid state imaging device, a sampling at a doubled sampling frequency is performed.

Figure 5:
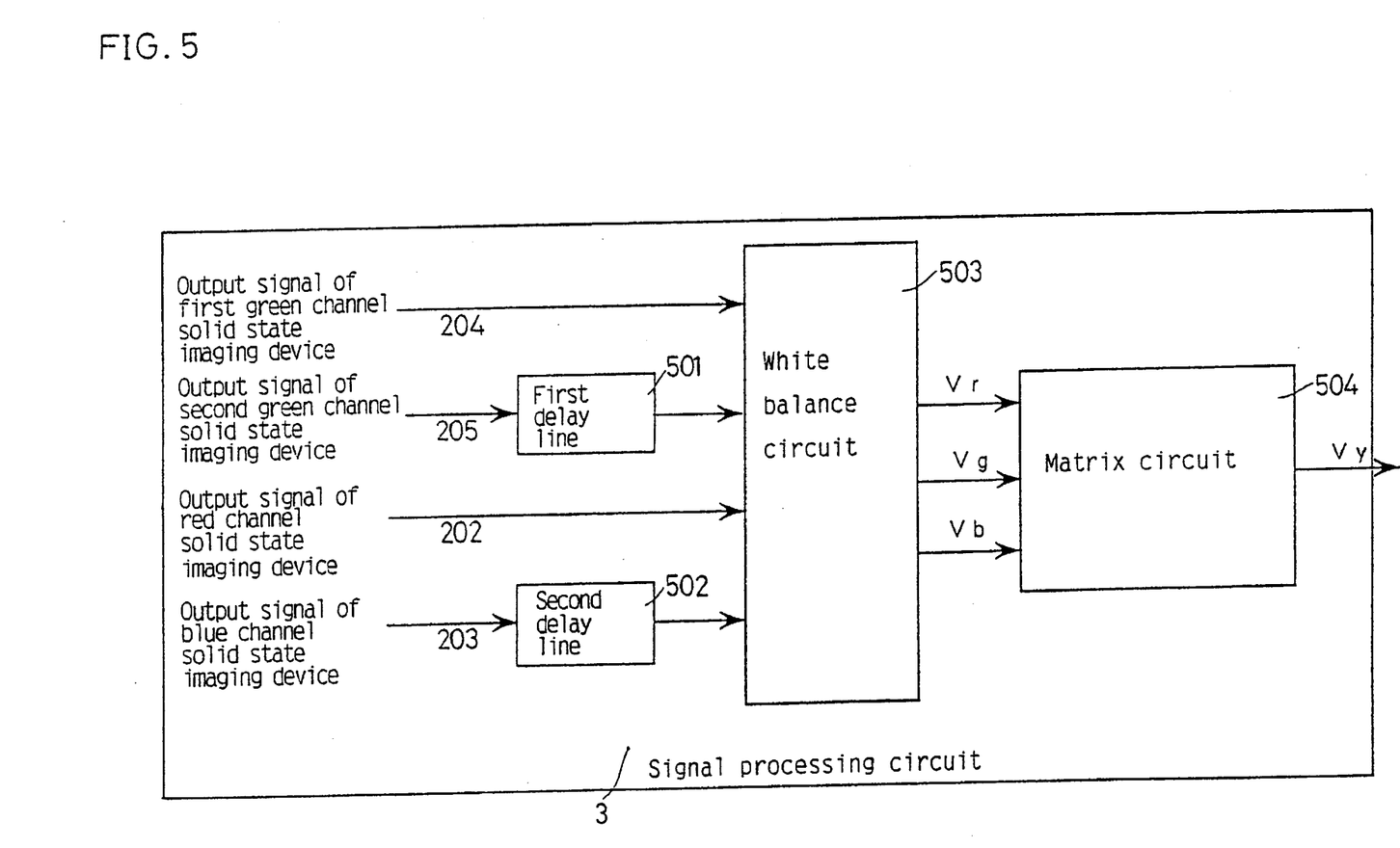
FIG. 5 is a block diagram of a signal processing circuit of a video camera of the first embodiment of the present invention.

FIG. 5 is a circuit block diagram of the signal processing circuit 3 of the video camera in accordance with the first embodiment of the present invention.

As shown In FIG. 5, the signal processing part 3 comprises a first delay line 501 for delaying a second green channel signal, a second delay line 502 for delaying a blue channel signal, a white balance circuit 503 which receives output signals from the first delay line 501, the second delay line 502, the output signal of the first green channel solid state imaging device 204 and the output signal of the red channel solid state imaging device 202, and a matrix circuit 504, which receives output signals Vr, Vg and Vb for red channel, green channel and blue channel, respectively, from the white balance circuit 503.

That is, the video signals issued from the first green channel solid state imaging device 204 and the red channel solid state imaging device 202 are inputted directly to a white balance circuit 503. The video signals issued from the second green channel solid state imaging device 205 and the blue channel solid state imaging device 203 are delayed by a half of the pixel period by the first delay line 501 and the second delay line 502, respectively, and inputted into the white balance circuit 503.

In the white balance circuit 503, firstly the first and the second green channel signals are added to each other at a ratio of 1:1. Then by adding signals from mutually pixel-offset solid state imaging devices, a composite wide band green channel signal is produced. Thus, the output signals of the first and the second green channel solid state imaging devices are combined into one. Thus, by doubling the number of pixel for green light for which human eyes have a high sensitivity, the image signal is made to have a wide frequency range.

Next, the white balance is taken by controlling the gains of the red channel signal, the blue channel signal and the green channel signal so as to make the levels of these three signals equal with each other at a time when the reference white is imaged.

The white-balanced respective color channel signals are inputted into a matrix circuit 504. In the matrix circuit, respective color signals are combined by a matrix ratio determined by a television standard being in use, and thereby the luminance signal is determined to be Vy. When the matrix ratio among the red channel signal Vr, the green channel signal Vg, and the blue channel signal Vb are set to be Kr:Kg:Kb, the luminance signal Vy is combined in accordance with a relation:

$$Vy = Kr \times Vr + Kg \times Vg + Kb \times Vb, \quad (1)$$

where Kr, Kg, and Kb are constants fulfilling a relation of $$Kr + Kg + Kb = 1. \quad (2)$$

At this time, the matrix ratios are set as follows: (i) in the Hi-Vision system, $$Kr = 0.2125, Kg = 0.7154, Kb = 0.0721, \quad (3)$$

(ii) in the NTSC television system, $$Kr = 0.299, Kg = 0.587, Kb = 0.114. \quad (4)$$

Here, explanation is given on the moire suppression effect by the offset sampling.

Figure 10:
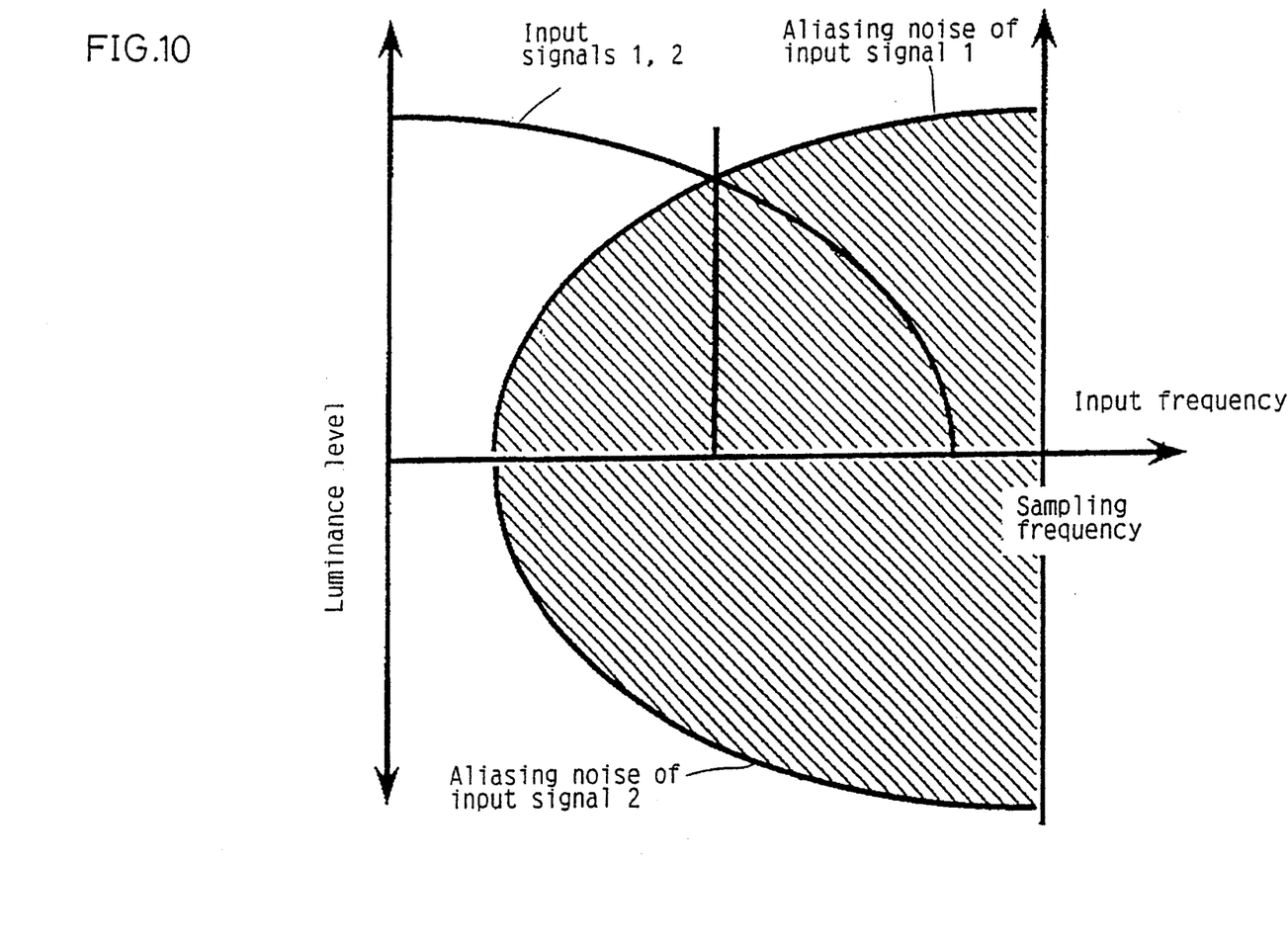
FIG. 10 is a graph of a frequency characteristic showing moire occurring as a function of frequency.

FIG. 10 is a graph of a frequency characteristic showing moire occurring as a function of frequency. The moire takes place due to the fact that the optical image is sampled by pixels. It is an aliasing noise occurring in a frequency range around a half of sampling frequency, the Nyquist frequency, having it as its center frequency. As is shown in FIG. 10, with respect to a moire component contained in the output from the one of those two solid state imaging devices which are mutually offset by a half pixel pitch, a moire component contained in the output from the other solid state imaging devices is offset by an amount of phase of 180°. Therefore, by adding them to each other, the moires contained in those two outputs are canceled, thereby the suppression of moire becomes possible. At time when two signals are added to each other, if the signal levels of those two outputs are equal, the levels of the moire component are also equal, and hence it becomes possible to suppress the moire perfectly.

According to the first embodiment of the present invention, the following effects are obtained.

By introducing the pixel offset between the first and the second green solid state imaging devices, even the peripheral part of tile imaging plane does not suffer from the effect of lens chromatic aberration, hence the moire suppression effect is not impeded. Furthermore, since the blue channel and the red channel solid state imaging devices are also mutually offset, in the luminance signal which is obtained by combining respective color signals the moire suppression effect can be obtained even for an object including only blue light and red light but excluding green light. In addition, as a result of pixel offsetting between the first and second green solid state imaging color devices, also for all colors, e.g., colors other than pure red color and pure blue color, for example, for color of green or for colors including both blue and red color the moire suppression effect can be obtained.

SECOND EMBODIMENT

Explanation is given on a video camera in accordance with a second embodiment of the present invention.

The configuration of the second embodiment is the same as that of the first embodiment for the imaging part 1, the driving part 2, and for the lens 4, whereas the configuration of the signal processing part is different. In the following, the configuration and the action of the signal processing part is explained.

Figure 6:
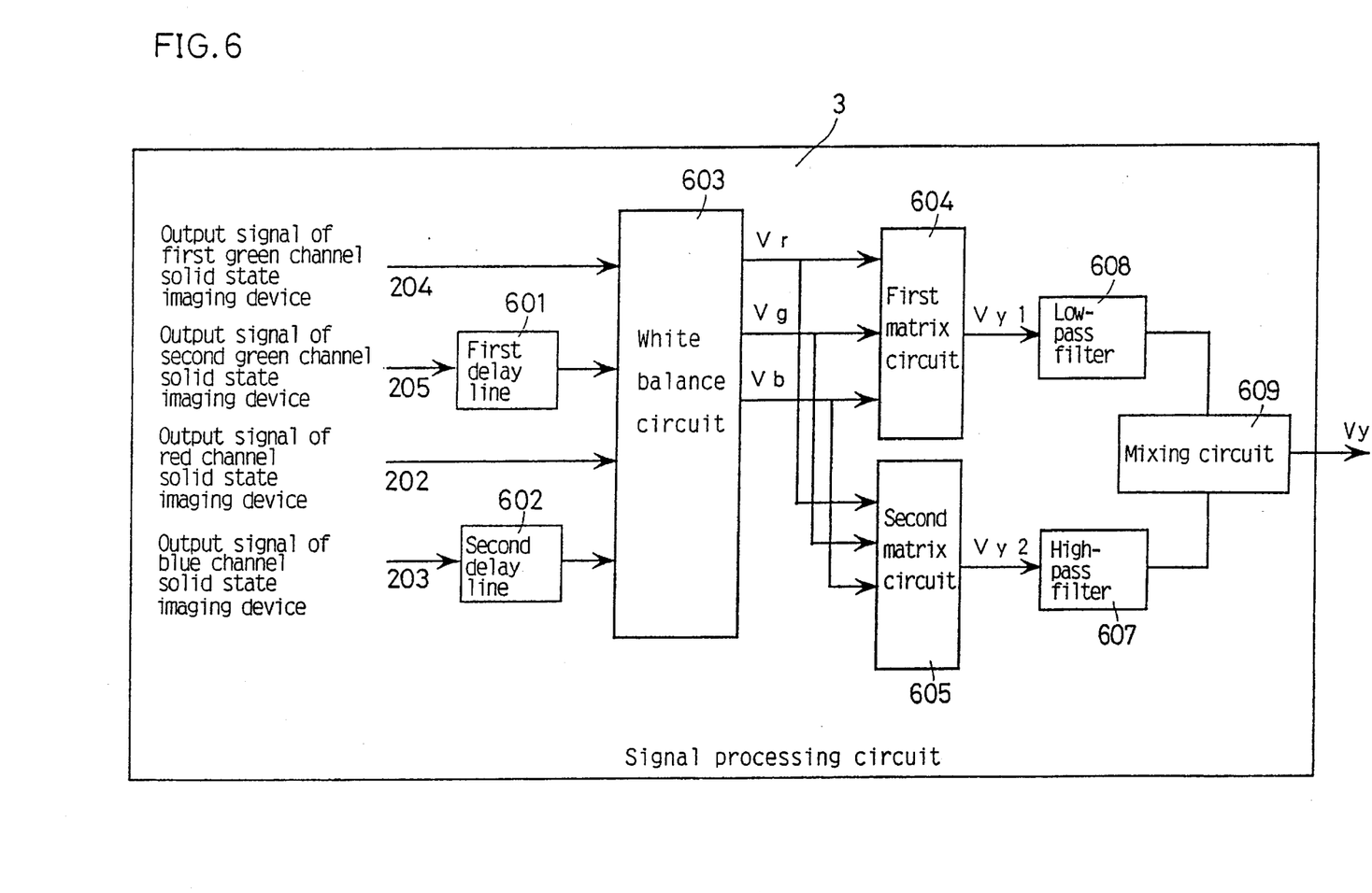
FIG. 6 is a block diagram of a signal processing of a video camera of the second embodiment of the present invention.

FIG. 6 is a circuit block diagram of a signal processing circuit 3 of the video camera in accordance with the second embodiment of the present invention.

The signal processing part 3 comprises a first delay line 601 for delaying a second green channel signal, a second delay line 602 for delaying a blue channel signal, a white balance circuit 603, a first matrix circuit 604 and a second matrix circuit 605 both of which receive output signals of the white balance circuit 603, a high-pass filter 607 and a low-pass filter 608 which receive output signals Vy2 and Vy1 of the second matrix circuit 605 and the first matrix circuit 604. respectively, and a mixing circuit 609 which receives output signals of the high-pass filter 607 and the low-pass filter 608.

The actions of signals from issuance from the solid state imaging devices 202, 203, 204, and 205 corresponding to respective color channels in FIG. 2 to passing through the white balance circuit 603 are the same as those of the first embodiment. The respective color channel signals Vr, Vg and Vb outputted from the white balance circuit 603 are respectively separated into two routes and inputted into the first matrix circuit 604 and the second matrix circuit 605.

The first matrix circuit 604 works the same action as the matrix circuit 504 in the first embodiment, and outputs a first luminance signal Vy1.

Defining the matrix ratio as Kr:Kg:Kb for the red channel signal Vr, the green channel signal Vg, and the blue channel signal Vb, the second matrix circuit 605 produces the second luminance signal output Vy2 which fulfills the following equation:

$$Vy2 = Kr \times Vr + Kg \times Vg + Kb \times Vb, \quad (5)$$

where the constants Kr, Kg, and Kb fulfill the following relation:

$$Kr + Kg + Kb = 1. \quad (6)$$

The matrix factor Kg for the green channel signal is set to a matrix factor determined by a television standard being in use; the matrix factors Kr and Kb respectively for the red channel signal and the blue channel signal are set to the same factor determined by (1-Kg)/2. Therefore, the matrix ratio of the second matrix circuit is set as follows:

(i) in the High-Vision system, $$Kr=0.1423,\ Kg=0.7154,\ Kb=0.1423,\ \text{and} \quad (7)$$

(ii) in the NTSC television system, $$Kr=0.2065,\ Kg=0.587,\ Kb=0.2065. \quad (8)$$

Next, the first luminance signal Vy1 having passed through a low pass filter 608 and a second luminance signal Vy2 having passed through a high-pass filter 607 are inputted into a mixing circuit 609. In the mixing circuit, these two signals are added to each other and outputted finally as the luminance signal Vy of a video camera.

According to the second embodiment of the present invention, the following technical advantage is obtained.

In the low frequency range of the luminance signal, the matrix ratio is set to a ratio determined by a television standard being in use, and hence the luminance error does not take place.

In the high frequency range of the luminance signal, after setting the matrix factor of the green channel signal, which has a relatively large factor within the luminance signal, to a factor determined by a television standard being in use, then those factors for the red channel signal and blue channel signal are calculated. Therefore, occurrence of the luminance error can be made small.

Furthermore, by combining the red channel signal and the blue channel signal in the same ratio, the signal levels of the red channel and the blue channel become equal at the time of signal addition in the mixing circuit. Therefore, it becomes possible to suppress completely the occurrence of moire for those colors containing red light component and blue light component at the same level as the color of e.g. pure white.

THIRD EMBODIMENT

Figure 7:
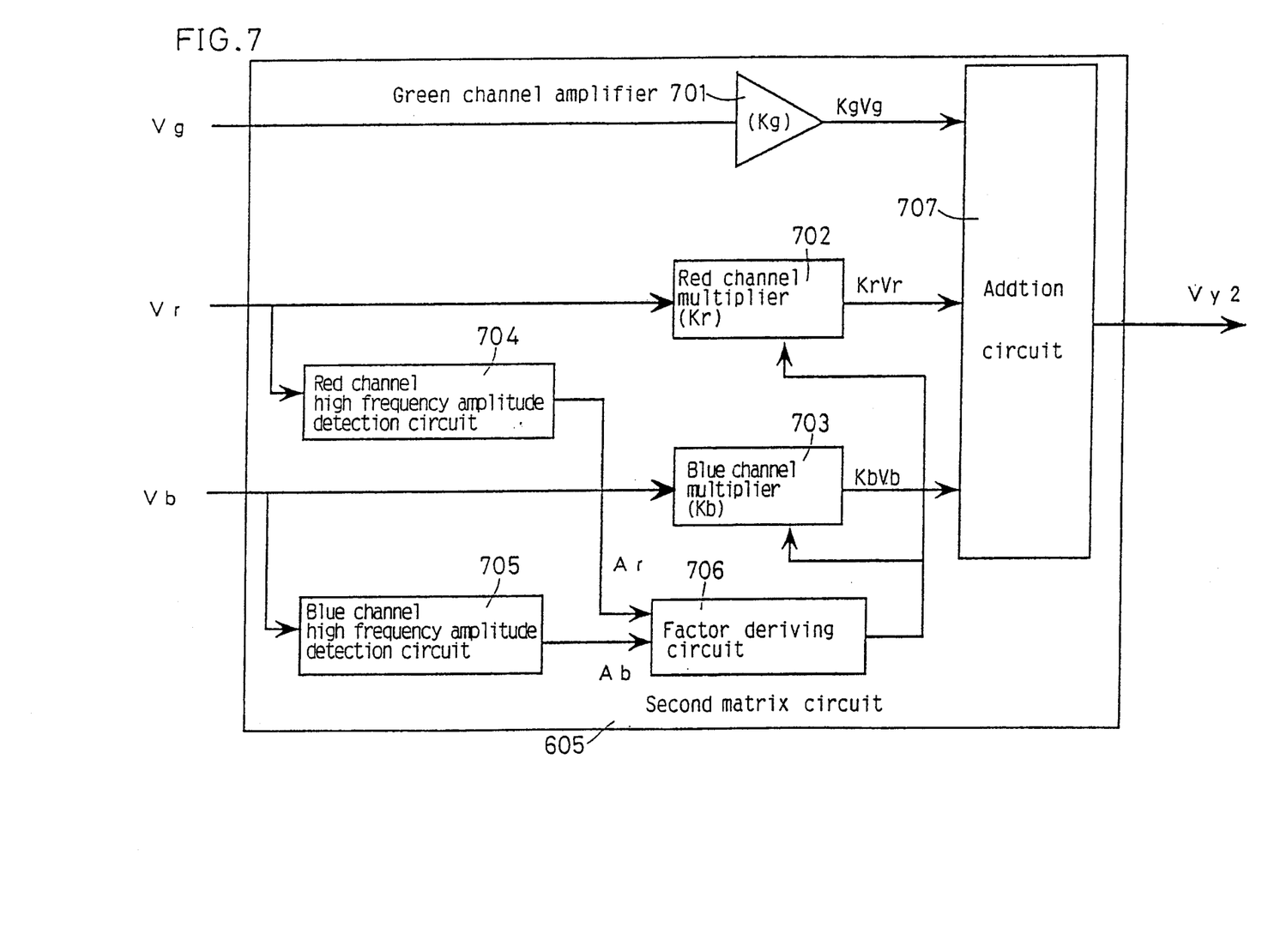
FIG. 7 is a block diagram of a second matrix circuit of the third embodiment of the present invention.

Explanation is given on a video camera in accordance with a third embodiment with reference to FIG. 7.

In the present embodiment, its configuration and action is similar to those of the second embodiment shown in FIG. 6. The only difference of the third embodiment from the second embodiment is the configuration and action of the second matrix circuit 605 of FIG. 6 of the second embodiment.

FIG. 7 is a block diagram showing detailed configuration of a second matrix circuit of the third embodiment of the present invention.

The matrix circuit comprises a green channel amplifier 701 for amplifying a green channel signal, a red channel multiplier 702 for multiplying a red channel signal, a blue channel multiplier 703 for multiplying a blue channel signal, a high frequency amplitude detection circuit 704 for the red channel signal, a high frequency amplitude detection circuit 705 for the blue channel signal, a factor deriving circuit 706 which receives outputs of the high frequency amplitude detection circuits 704 for the red channel signal and the high frequency amplitude detection circuits 705 for the blue channel signal thereby issue multiplying factor signal to the red channel multiplier 702 and to the blue channel multiplier 703, and an addition circuit 707 for summing outputs of the green channel amplifier 701, the red channel multiplier 702 and the blue channel multiplier 703 thereby to issue summed signal as the second luminance signal Vy2.

In the following, explanation is given on a method of setting the factors in the second matrix circuit.

The condition of the second matrix circuit 605 required in the third embodiment is to make the level of the produced second luminance signal Vy2 issued from the second matrix circuit 605 equal to the level of the first luminance signal Vy1 given from the first matrix circuit 604, when combining in a matrix ratio determined by the television standard even in the high frequency range so as to eliminate the luminance error. At the same time, this configuration must suppress the moire completely for those colors in which the red light component and the blue light component are contained at the equal level, that is, for colors such as white, magenta, and green.

In order to achieve the above-mentioned condition, the matrix factors Kr and Kb of the red channel signal and of the blue channel signal are adjusted adaptively responding to the red and blue high frequency amplitudes. In the following, method of calculation of factors is explained.

Taking the matrix ratio determined by the television standard having red, green, and blue channel signals Vr, Vg, and Vb to be kr:kg:kb (where kr+kg+kb=1), the first luminance level Vy1 is expressed as:

$$Vy1 = kr \times Vr + kg \times Vg + kb \times Vb. \quad (9)$$

And taking the matrix ratio to be sought as Kr:Kg:Kb, the second luminance level Vy2 to be outputted is expressed as:

$$Vy2 = Kr \times Vr + Kg \times Vg + Kb \times Vb. \quad (10)$$

As for the condition for eliminating the luminance error, it is necessary to fulfill a condition $$Vy2 = Vy1. \quad (11)$$

The above-mentioned equation means that the level of Vy2 produced by setting a matrix ratio, which is different from a matrix ratio determined by the television standard, becomes equal to the level of Vy1 produced at a matrix ratio determined by the television standard.

Furthermore, concerning those colors in which the red light component and the blue light component are contained at the equal level such as pure white, for suppressing the moire completely, it is necessary to make the signal levels of the red channel and the blue channel equal by setting as:

$$Kr=Kb. \qquad (12)$$

Then, letting high frequency amplitude voltages of the red and the blue channel signals to be Ar and Ab, and taking the matrix factor Kg of the green channel signal to be kg which is determined from the television standard, from the conditional equations (11) and (12), the following relation holds;

$$Kr \times Ar + kb \times Ab = kr \times Ar + kb \times Ab. \qquad (13)$$

By solving this equation about Kb, the following relation is obtained;

$$Kb=(kr \times Ar + kb \times Ab)/(Ar+Ab). \qquad (14)$$

Accordingly, the matrix factors of respective color signals in the second matrix circuit are set as follows;

$$Kr=Kb=(kr \times Ar + kb \times Ab)/(Ar+Ab), \qquad (15)$$

$$Kg=kg. \qquad (16)$$

Explanation is given on the action of the matrix circuit for realizing these ratios.

Among those respective color channel signals inputted to the matrix circuit, the red channel signal Vr is inputted to the red channel multiplier 702 and the red channel high frequency signal amplitude detection circuit 704. Similarly a blue channel signal is inputted to the blue channel multiplier 703 and the blue channel high frequency amplitude detection circuit 705. The multipliers 702 and 703 have two input terminals and each outputs a signal proportional to a multiplication of these two input signals.

The red channel high frequency amplitude detection circuit 704 detects the signal amplitude in the high frequency range of the red channel signal and outputs the red signal high frequency amplitude voltage Ar to the factor deriving circuit 706.

The blue channel high frequency amplitude detection circuit 705 also detects the signal amplitude in the high frequency range of the blue channel signal and outputs the blue signal high frequency amplitude voltage Ab to the factor deriving circuit 706.

The factor deriving circuit 706 computes or produces the matrix factors Kr and Kb which were derived before, and input them respectively to the red channel multiplier 702 and the blue channel multiplier 703. The red channel multiplier 702 and the blue channel multiplier 703 perform their multiplication function on the red and blue channel signals Vr and Vb by multiplying them by their respective matrix factors Kr and Kb and output them.

Among those respective color channel signals inputted to the matrix circuit, the green channel signal Vg is inputted to the green channel amplifier 701 and its amplification gain is set to be Kg as matrix factor for green channel.

Thus, those respective color channel signals which were already multiplied by matrix factors are inputted to the addition circuit 707 and outputted as a second luminance signal Vy2.

Therefore, in accordance with the third embodiment of the present invention, the following effects are obtained.

In the low frequency range of the luminance signal, since the matrix ratio is taken to be a ratio determined by a television standard being in use, the luminance error does not occur.

In the high frequency range of the luminance signal, the matrix factor of the green channel, which has a large occupying factor within the luminance signal is set as a factor determined by a television standard being in use, and those factors for the red channel signal and blue channel signal are set to such factors that which are mutually equal so that the second luminance signal level becomes equal to the first luminance signal level determined by the television standard being in use. By the above-mentioned settings of the matrix factors, the luminance error can be eliminated.

By combining the red signal and blue signal with the same ratio, the moire is completely suppressed with regard to those colors containing the red light component and the blue light component at the equal level such as pure white, magenta or green.

FOURTH EMBODIMENT

Explanation is given on a video camera in accordance with the fourth embodiment of the present invention.

In this fourth embodiment, the configuration and action are similar to the configuration and action of the second embodiment of FIG. 6. The only difference of the fourth embodiment from the second embodiment is configuration and action of the second matrix circuit 605 of FIG. 6 in the second embodiment.

Figure 8:
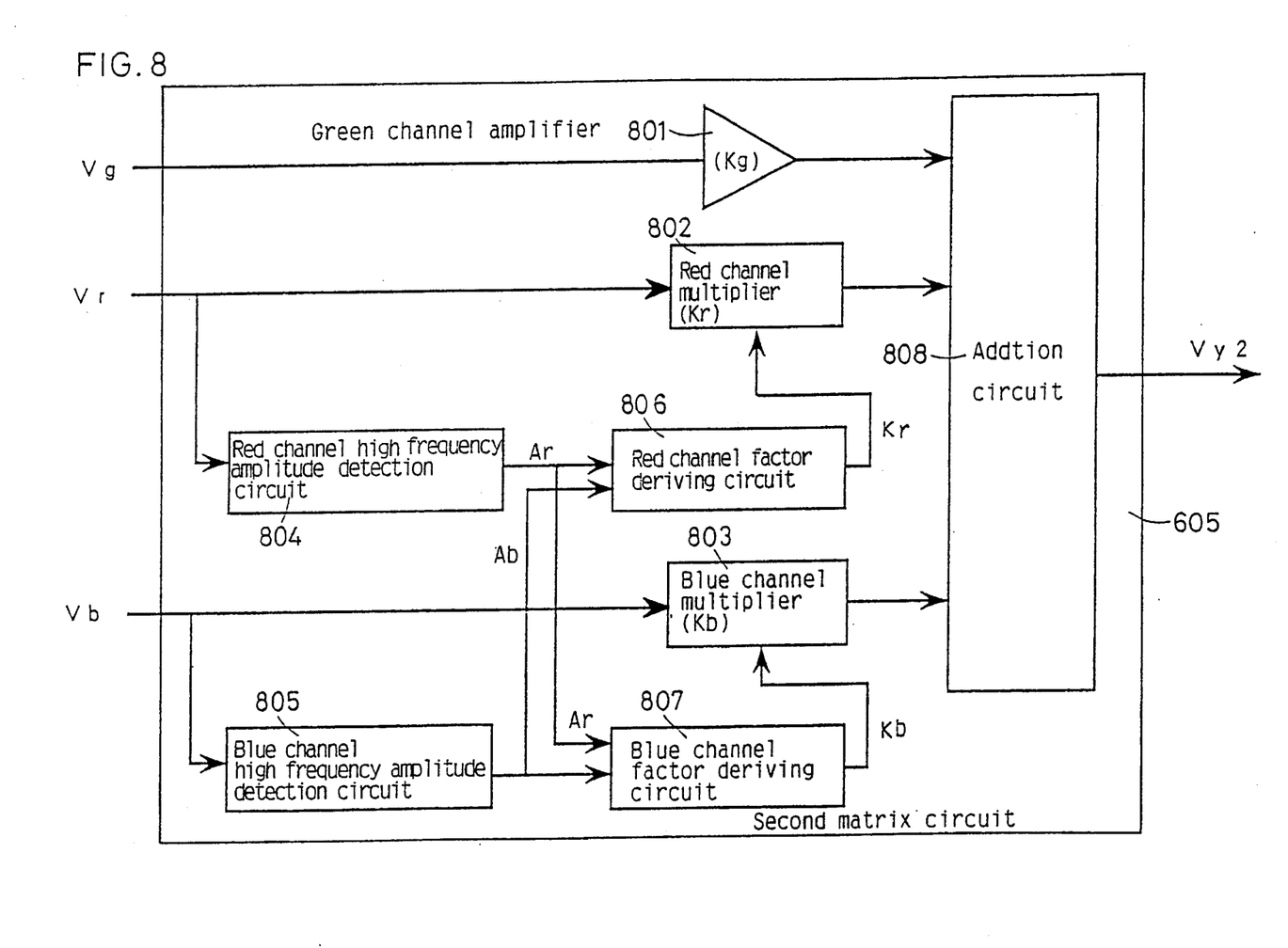
FIG. 8 is a block diagram of a second matrix circuit of the fourth embodiment of the present invention.

FIG. 8 is a block diagram of a second matrix circuit by the fourth embodiment of the present invention.

The matrix circuit comprises a green channel amplifier 801, a red channel multiplier 802, a blue channel multiplier 803, a red channel high frequency amplitude detection circuit 804, a blue channel high frequency amplitude detection circuit 805, a red channel factor deriving circuit 806 which receives outputs from the red channel high frequency amplitude detection circuit 804 and the blue channel high frequency amplitude detection circuit 805 and issues a red channel factor signal Kr to the red channel multiplier 802, a blue channel factor deriving circuit 807 which receives outputs from the blue channel high frequency amplitude detection circuit 805 and the red channel high frequency amplitude detection circuit 804 and issues a blue channel factor signal Kb to the blue channel multiplier 803, and an addition circuit 808 for summing outputs of the green channel amplifier 801, the red channel multiplier 802 and the blue channel multiplier 803 thereby to issue summed signal Vy2 as the second luminance signal Vy2.

In the following, explanation is given on a method of setting the factors Kr and Kb in the second matrix circuit 605.

The condition of the second matrix circuit 605 required in the fourth embodiment is to make the level of the produced second luminance signal Vy2 issued from the second matrix circuit 605 equal to the level of the normal luminance signal determined by the television standard even in the high frequency range, that is, to eliminate the luminance error. And, also to suppress the moire completely for colors other than pure colors of red and blue.

Then matrix factors Kr and Kb of the red channel signal and of the blue channel signal are changed adaptively responding to the red and blue high frequency amplitudes. In the following, method of calculation of factors is explained.

Taking the matrix ratio determined by the television standard having red, green, and blue channel signals Vr, Vg, and Vb to be kr:kg:kb (where kr+kg +kb =1), the first luminance level Vy1 is expressed as:

$$Vy1 = kr \times Vr + kg \times Vg + kb \times Vb.$$

And taking the matrix ratio to be sought as Kr:Kg:Kb, the second luminance level Vy2 to be outputted is expressed as:

$$Vy2 = Kr \times Vr + Kg \times Vg + Kb \times Vb.$$

As the condition for eliminating the luminance error, it is necessary to fulfill a condition $$Vy2 = Vy1. \quad (17)$$

The above-mentioned equation means that the level of Vy2 produced by setting a matrix ratio, which is different from a matrix ratio determined by the television standard, becomes equal to the level of Vy1 produced at a matrix ratio determined by the television standard.

Furthermore for those colors in which the red light component and the blue light component are contained at the equal level, to suppress the moire completely, it is necessary to make the signal levels of the red channel and the blue channel equal by setting as $$Kr \times Vr = Kb \times Vb. \quad (18)$$

Then, letting high frequency amplitude voltages of the red and the blue channel signals to be Ar and Ab, and taking the matrix factor Kg of the green channel signal to be kg which is determined from the television standard, from the conditional equations (17) and (18), the following relation holds:

$$2 \times Kr \times Ar = kr \times Ar + kb \times Ab. \quad (19)$$

$$2 \times Kb \times Ab = kr \times Ar + kb \times Ab. \quad (20)$$

By solving these equations about Kb, the following relation is obtained;

$$Kr = (kr \times Ar + kb \times Ab)/(2 \times Ar), \quad (21)$$

$$Kb = (kr \times Ar + kb \times Ab)/(2 \times Ab). \quad (22)$$

Accordingly, the matrix factors of respective color signals in the second matrix circuit are set as follows;

$$Kr = (kr \times Ar + kb \times Ab)/(2 \times Ar), \quad (23)$$

$$Kg = kg, \quad (24)$$

$$Kb = (kr \times Ar + kb \times Ab)/(2 \times Ab). \quad (25)$$

Explanation is given on the action of the matrix circuit for realizing these ratios.

Among those respective color channel signals inputted to the matrix circuit, the red channel signal Vr is inputted to the red channel multiplier 802 and the red channel high frequency amplitude detection circuit 804. Similarly a blue channel signal is inputted to the blue channel multiplier 803 and the blue channel high frequency amplitude detection circuit 805. The multipliers 802 and 803 have two input terminals and each outputs a signal proportional to a multiplication between these two input signals.

The red channel high frequency amplitude detection circuit 804 detects the signal amplitude in the high frequency range of the red channel signal and outputs a red signal high frequency amplitude voltage Ar to the red channel factor deriving circuit 806 and the blue channel factor deriving circuit 807.

The blue channel high frequency amplitude detection circuit 805 also detects the signal amplitude in the high frequency range of the blue channel signal and outputs a blue signal high frequency amplitude voltage Ab to the red channel factor deriving circuit 806 and the blue channel factor deriving circuit 807.

The red channel factor deriving circuit 806 computes or produces the matrix factors Kr which was derived before, and outputs it to the red channel multiplier 802. The blue channel factor deriving circuit 807 computes or produces the matrix factor Kb which was derived before, and outputs it to the blue channel multiplier 803. The red and the blue channel multipliers 802 and 803 perform their multiplication function on the red and blue channel signals Vr and Vb by multiplying them by their respective matrix factors Kr and Kb and output them to the addition circuit 808.

Among those respective color channel signals Vg, Vr and Vb inputted to the matrix circuit 605, the green channel signal Vg is inputted to the green channel amplifier 801 and its amplification gain is set to be Kg as a matrix factor for green channel.

Thus those respective color channel signals which were already multiplied by matrix factors are inputted to the addition circuit 808 and outputted as a summed second luminance signal Vy2.

Therefore, according to the fourth embodiment of the present invention, the following technical effects are obtained.

In the low frequency range of the luminance signal, the matrix ratio is taken to be a ratio determined by a television standard in use and therefore the luminance error does not occur.

In the high frequency range of the luminance signal, the matrix factors are set as follows: (i) the matrix factor of the green channel, which has a large occupying factor within the luminance signal, is set to a factor determined by a television standard in use, and on the other hand, (ii) the matrix factors for the red channel signal and blue channel signal are set so that the second luminance signal level becomes equal to the first luminance signal level, which has been combined with factors determined by the television standard in use. By the above-mentioned settings of the matrix factors, the luminance error can be eliminated.

By combining the red signal and blue signal in the same level, the moire is suppressed completely for colors other than the pure colors of red and blue.

FIFTH EMBODIMENT

Figure 9:
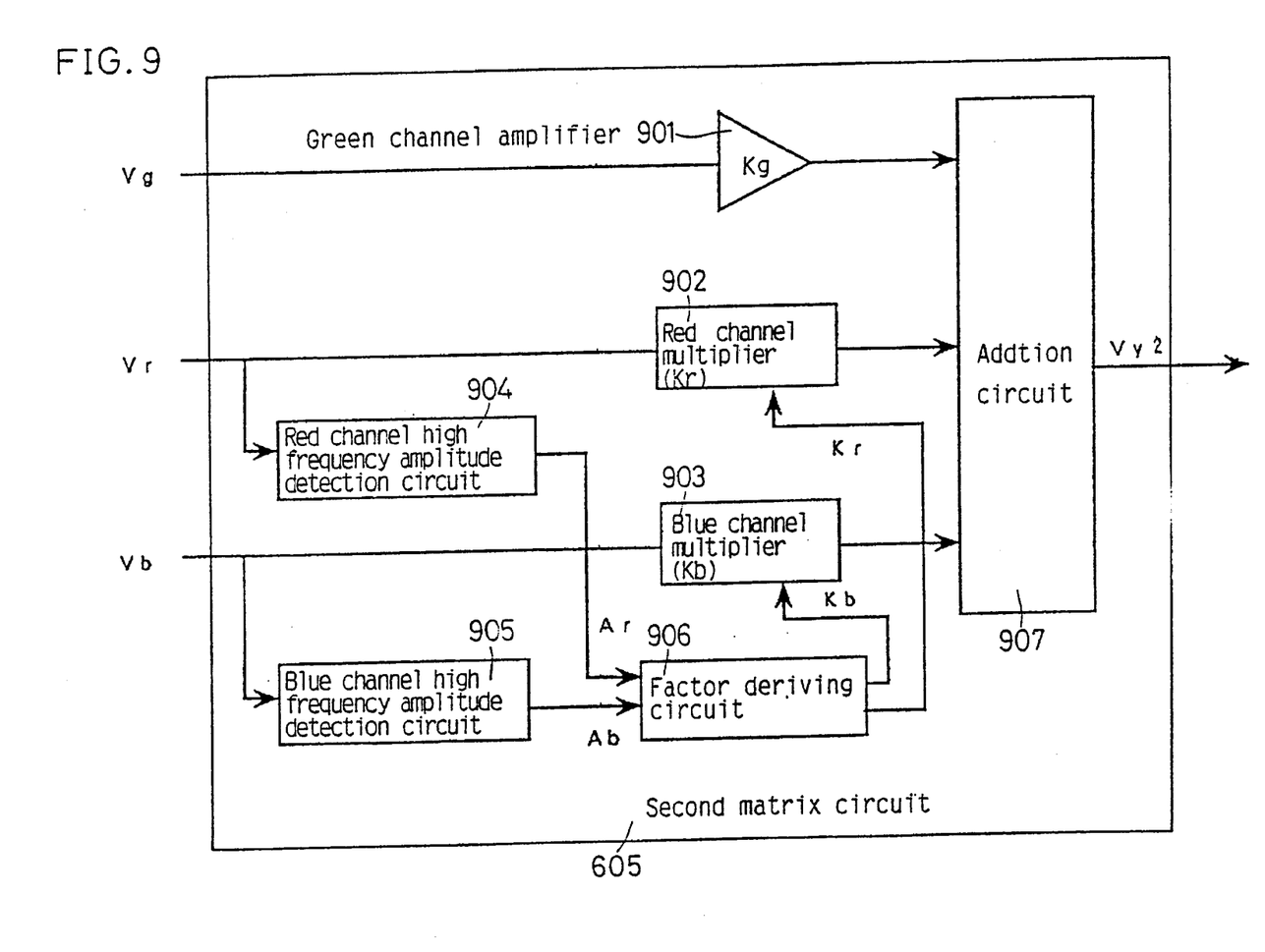
FIG. 9 is a block diagram of a second matrix circuit of the fifth embodiment of the present invention.

Explanation is given on a fifth embodiment of video camera in accordance with the fifth embodiment of the present invention with reference to FIG. 9.

In the present embodiment, its configuration and action are almost the same to that of the second embodiment, but the configuration and action of the second matrix circuit 605 in FIG. 6 which has been used for the second embodiment is different.

In the following, explanation is given on the second matrix circuit 605 shown in FIG. 9.

FIG. 9 is a block diagram of a second matrix circuit 605 of the fifth embodiment of the present invention.

The matrix circuit 605 comprises a green channel amplifier 901, a red channel multiplier 902, a blue channel multiplier 903, a red channel high frequency amplitude detection circuit 904, a blue channel high frequency amplitude detection circuit 905, a red channel factor deriving circuit 906 which receives outputs of the red channel high frequency amplitude detection circuit 904 and the blue channel high frequency amplitude detection circuit 905 and issues a red channel factor signal Kr to the red channel multiplier 902 and further a blue channel factor signal Kb to the blue channel multiplier 903, and an addition circuit 907 for summing outputs of the green channel amplifier 901, the red channel multiplier 902 and the blue channel multiplier 903 thereby to issue summed signal Vy2 as the second luminance signal Vy2.

Among respective color channel signals inputted into the matrix circuit, the red channel signal Vr is inputted into the red channel multiplier 902 and the red channel high frequency amplitude detection circuit 904. Similarly, the blue channel signal is inputted into the blue channel multiplier 903 and tile blue channel high frequency amplitude detection circuit 905. These multipliers 902, 903 respectively have two inputs, namely red channel signal Vr and blue channel signal Vb from the white balance circuit 603 and the red channel factor signal Kr and the blue channel factor signal Kb from the factor deriving circuit 906. And the multipliers 902 and 903 respectively output signals of multiplication of those two kinds of inputs.

The action of the second matrix circuit 605 of FIG. 9 is as follows. The red channel high frequency amplitude detection circuit 904 detects the amplitude of high frequency range of the red channel signal Vr and gives the red channel high frequency voltage Ar to the channel factor deriving circuit 906.

The blue channel high frequency amplitude detection circuit 904 detects the amplitude of high frequency range of the blue channel signal Vb and gives the blue channel high frequency voltage Ab to the channel factor deriving circuit 906.

The channel factor deriving circuit 906 computes and produces the red channel matrix factor Kr and the blue channel matrix factor Kb gives them respectively to the red and the blue channel multipliers 902 and 903. The red and the blue channel multipliers 902 and 903 respectively multiply the red and the blue channel signals Vr and Vb by respective matrix factors Kr and Kb and outputs the products to the addition circuit 907.

Among respective color channel signals inputted into the matrix circuit 605, the green channel signal Vg is inputted into the green channel multiplier 901 whereof the amplification gain is Kg as matrix factor for green channel. The red channel signal Vr is inputted into the red channel multiplier 902, whereof the matrix factor is Kr. The blue channel signal Vb is inputted into the blue channel multiplier whereof the matrix factor is Kb.

In this manner, those respective color channel signals multiplied by the respective matrix factors are inputted into the addition circuit 907 and outputted as a second luminance signal Vy2.

Therefore, according to the fifth embodiment of the present invention, similar technical effects as the fourth embodiment are obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A solid state video camera comprising:

an imaging part having:
   a prism for decomposing an optical image into first and second green channels, a red channel, and a blue channel, the prism including first and second green optical outputs respectively corresponding to the first and second green channels, a red optical output corresponding to the red channel, and a blue optical output corresponding to the blue channel;
   first and second green channel solid state imaging devices respectively disposed at the first and second green optical outputs for outputting first and second green video signals corresponding to the respective channels, the first and second green channel imaging devices being mutually offset by one half of a pixel in a horizontal direction with respect to the optical image; and
   red and blue channel solid state imaging devices respectively disposed at the red and blue optical outputs for outputting red and blue video signals corresponding to the respective channels, the red and blue channel imaging devices being mutually offset by one half of a pixel in the horizontal direction with respect to the optical image; and a signal processing part having:
   a white balance circuit for receiving video signals corresponding to the first and second green video signals and the red and blue video signals, for summing the video signals corresponding to the first and second green video signals in a 1:1 ratio, for performing a white balance adjustment on the summed green video signals and the video signals corresponding to the red and blue video signals, and for outputting white balanced red, green, and blue channel signals;
   a first matrix circuit for receiving the white balanced red, green, and blue channel signals and outputting a first luminance signal according to a first matrix ratio determined by a television standard in use;
   a second matrix circuit for receiving the white balanced red, green, and blue channel signals and outputting a second luminance signal according to a second matrix ratio Kr:Kg:Kb where Kr+Kg+Kb=1, Kg is the factor of to the green channel signal and is determined by the television standard, Kr is the factor of the red channel signal and is determined according to the formula Kr=(1=Kg)/2, and Kb is the factor of the blue channel signal and is determined according to the formula Kb=(1−Kg)/2; and
   a mixing circuit for receiving and summing luminance signals corresponding to the first and second luminance signals, and outputting a summed luminance signal.

2. A solid state video camera comprising:

an imaging part having:
   a prism for decomposing an optical image into first and second green channels, a red channel, and a blue channel, the prism including first and second green optical outputs respectively corresponding to the first and second green channels, a red optical output corresponding to the red channel, and a blue optical output corresponding to the blue channel;
   first and second green channel solid state imaging devices respectively disposed at the first and second green optical outputs for outputting first and second green video signals corresponding to the respective channels, the first and second green channel imaging devices being mutually offset by one half of a pixel in a horizontal direction with respect to the optical image; and red and blue channel solid state imaging devices respectively disposed at the red and blue optical outputs for outputting red and blue video signals corresponding to the respective channels, the red and blue channel imaging devices being mutually offset by one half of a pixel in the horizontal direction with respect to the optical image; and a signal processing part having:

a white balance circuit for receiving video signals corresponding to the first and second green video signals and the red and blue video signals, for summing the video signals corresponding to the first and second green video signals in a 1:1 ratio, for performing a white balance adjustment on the summed green video signals and the video signals corresponding to the red and blue video signals, and for outputting white balanced red, green, and blue channel signals;

a first matrix circuit for receiving the white balanced red, green, and blue channel signals and outputting a first luminance signal according to a first matrix ratio determined by a television standard in use;

a second matrix circuit for receiving the white balanced red, green, and blue channel signals and outputting a second luminance signal according to a second matrix ratio which adaptively responds to an amplitude of a high frequency component of at least one of the red, green, and blue channel signals; and a mixing circuit for receiving and summing luminance signals corresponding to the first and second luminance signals, and outputting a summed luminance signal.

3. A solid state video camera in accordance with claim 2 wherein in said second matrix circuit:

the first matrix ratio determined by the television standard is kr:kg:kb, where kr+kg+kb=1, the high frequency component amplitude of the red channel signal is Ar, and the high frequency component amplitude of the blue channel signal is Ab, and the second matrix ratio Kr:Kg:Kb of the second matrix circuit is set as:

$Kr=(kr{\times}Ar+kb{\times}Ab)/(Ar+Ab)$, $Kg=kg$, $Kb=Kr=(kr{\times}Ar+kb{\times}Ab)/(Ar+Ab)$.

4. A solid state video camera in accordance with claim 3 wherein the second matrix circuit comprises:

a red channel high frequency amplitude detection circuit for receiving the red channel signal, detecting the high frequency component amplitude of the red channel signal Ar, and outputting the signal Ar;

a blue channel high frequency amplitude detection circuit for receiving the blue channel signal, detecting the high frequency component amplitude of the blue channel signal Ab, and outputting the signal Ab;

a factor deriving circuit for receiving the red and the blue channel high frequency amplitude signals Ar, Ab, for computing the matrix factor Kr=Kb therefrom, and for outputting a factor signal Kr=Kb;

a green channel amplifier for receiving the green channel signal, amplifying the green channel signal by the amplification gain Kg, and outputting the amplified green channel signal;

a red channel multiplier for receiving the red channel signal and the factor signal Kr=Kb, multiplying the red channel signal by the factor signal Kr=Kb, and outputting the multiplied red channel signal;

a blue channel multiplier for receiving the blue channel signal and the factor signal Kr=Kb, multiplying the blue channel signal by the factor signal Kr=Kb, and outputting the multiplied blue channel signal; and an addition circuit for receiving and summing the amplified green channel signal, the multiplied red channel signal, and the multiplied blue channel signal, and for outputting the summed signal as the second luminance signal.

5. A solid state video camera in accordance with claim 2 wherein in said second matrix circuit:

the first matrix ratio determined by the television standard is kr:kg:kb, where kr+kg+kb=1, the high frequency component amplitude of the red channel signal is Ar, and the high frequency component amplitude of the blue channel signal is Ab, and the second matrix ratio Kr:Kg:Kb of the second matrix circuit is set as:

$Kr=(kr{\times}Ar+kb{\times}Ab)/(2{\times}Ar)$, $Kg=kg$, $Kb=(kr{\times}Ar+kb{\times}Ab)/(2{\times}Ab)$.

6. A solid state video camera in accordance with claim 5 wherein the second matrix circuit comprises:

a red channel high frequency amplitude detection circuit for receiving the red channel signal, detecting the high frequency component amplitude of the red channel signal At, and outputting the signal Ar;

a blue channel high frequency amplitude detection circuit for receiving the blue channel signal, detecting the high frequency component amplitude of the blue channel signal Ab, and outputting the signal Ab;

a red channel factor deriving circuit for receiving the red and the blue channel high frequency amplitude signals Ar, Ab, for computing the matrix factor Kr therefrom, and for outputting a factor signal Kr;

a blue channel factor deriving circuit for receiving the red and the blue channel high frequency amplitude signals Ar, Ab, for computing the matrix factor Kb therefrom, and for outputting factor signal Kb;

a green channel amplifier for receiving the green channel signal, amplifying the green channel signal by the amplification gain Kg, and outputting the amplified green channel signal;

a red channel multiplier for receiving the red channel signal and the factor signal Kr, multiplying the red channel signal by the factor signal Kr, and outputting the multiplied red channel signal;

a blue channel multiplier for receiving the blue channel signal and the factor signal Kb, multiplying the blue channel signal by the factor signal Kb, and outputting the multiplied blue channel signal; and an addition circuit for receiving and summing the amplified green channel signal, the multiplied red channel signal, and the multiplied blue channel signal, and for outputting the summed signal as the second luminance signal.

7. A solid state video camera in accordance with claim 5 wherein the second matrix circuit comprises:

a red channel high frequency amplitude detection circuit for receiving the red channel signal, detecting the high frequency component amplitude of the red channel signal Ar, and outputting the signal Ar;

a blue channel high frequency amplitude detection circuit for receiving the blue channel signal, detecting the high frequency component amplitude of the blue channel signal Ab, and outputting the signal Ab;

a factor deriving circuit for receiving the red and the blue channel high frequency amplitude signals Ar, Ab, for computing the matrix factors Kr and Kb therefrom, and for outputting factor signals Kr and Kb;

a green channel amplifier for receiving the green channel signal, amplifying the green channel signal by the amplification gain Kg, and outputting the amplified green channel signal;

a red channel multiplier for receiving the red channel signal and the factor signal Kr, multiplying the red channel signal by the factor signal Kr, and outputting the multiplied red channel signal;

a blue channel multiplier for receiving the blue channel signal and the factor signal Kb, multiplying the blue channel signal by the factor signal Kb, and outputting the multiplied blue channel signal; and an addition circuit for receiving and summing the amplified green channel signal, the multiplied red channel signal, and the multiplied blue channel signal, and for outputting the summed signal as the second luminance signal.

* * * * *